Aug. 30, 1955 L. SCHMID 2,716,355
STEERING MECHANISM HAVING A YIELDABLE STEERING
SHAFT FOR AUTOMOTIVE VEHICLES
Filed Jan. 12, 1953
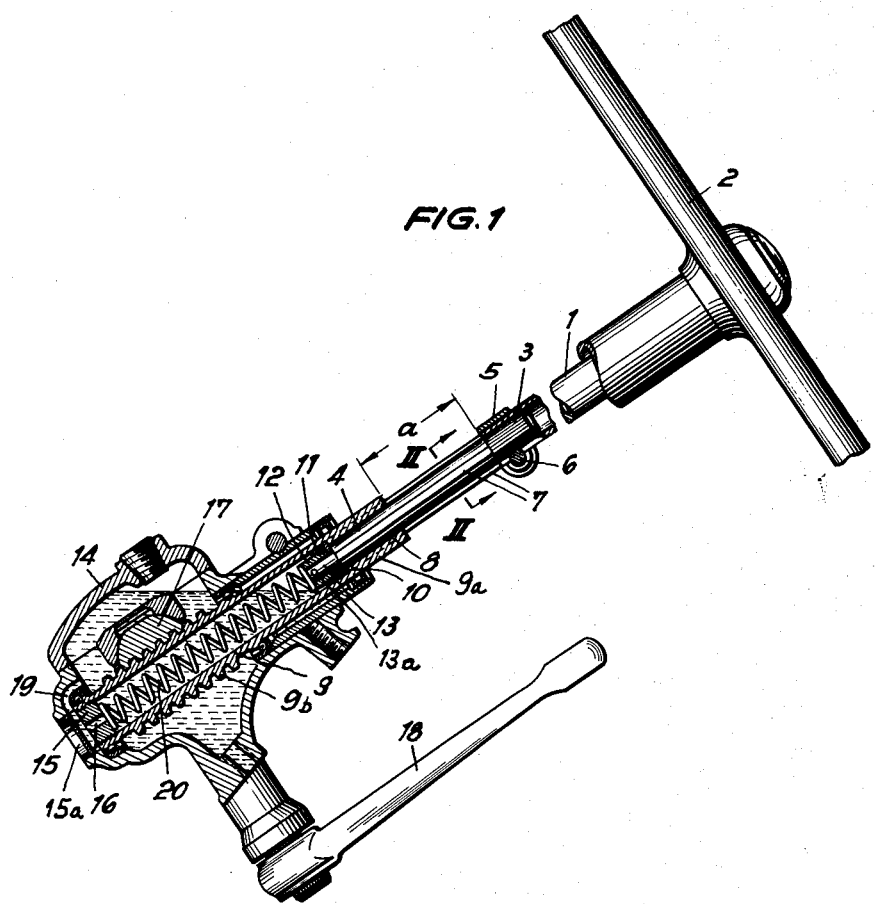
FIG.1
FIG.2
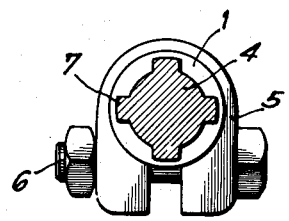
INVENTOR
Leopold Schmid
BY
Pennie, Edmonds, Morton, Barrows & Taylor

United States Patent Office 2,716,355
Patented Aug. 30, 1955

2,716,355

STEERING MECHANISM HAVING A YIELDABLE STEERING SHAFT FOR AUTOMOTIVE VEHICLES

Leopold Schmid, Stuttgart-Sillenbuch, Germany, assignor to Dr. Ing. h. c. F. Porsche K.-G., Stuttgart-Zuffenhausen, Germany Application January 12, 1953, Serial No. 330,675

Claims priority, application Germany January 26, 1952

8 Claims. (Cl. 74—493)

The present invention relates to improvements in steering mechanism for automotive vehicles and more particularly to a steering mechanism including a yieldable steering shaft for protecting the driver of the vehicle.

Various proposals have been made for constructing yieldable steering shafts for motor vehicles in order to protect the driver from injury resulting from sudden impacts occurring when the vehicle strikes an object or is involved in a collision. In such proposals the steering shaft is usually made of two telescoping parts biased or held in their extended position by a coil spring or by hydraulic fluid. These constructions, however, have the disadvantage that the steering shaft must be made in two parts, which make for a bulky construction or involve the use of visible mechanical or hydraulic mechanisms at the juncture point. Usually in the case of yieldable hydraulic means a separate supply container for hydraulic fluid must be provided and care must be taken to insure that all parts of the hydraulic mechanism are properly sealed off. These factors contribute to provide a relatively complicated mechanism which is too expensive for general use, and may be the reason why yieldable steering shafts are not provided on automotive vehicles at the present time, although the provision of a yieldable steering shaft would avoid or greatly reduce injuries resulting from the driver being thrown against the steering wheel of the vehicle.

The object of the invention is therefore to provide a yieldable steering shaft which is simple in construction, easy and inexpensive to manufacture and not readily apparent from the outside.

According to the present invention it has been discovered that the foregoing difficulties and disadvantages can be avoided and a relatively simple and inexpensive construction provided by connecting the steering shaft with the actuating mechanism inside of the steering gear housing so that it is axially shiftable, the shaft being urged outwardly by a spring. In accordance with the invention the steering shaft may be designed substantially in the conventional manner and in such a way that the mechanism which makes the shaft yieldable is not visible from the outside.

In a preferred form of construction the gear actuating means in the steering gear housing is made hollow thereby providing a cylindrical member into which the steering shaft extends and to which it is keyed. In this structure a piston carried by the lower end of the shaft is slidably arranged in the cylindrical actuating member in the steering gear housing.

According to a feature of the invention the oil used in the steering gear housing is used as a hydraulic fluid in the lower end of the hollow actuating member, the lower end of this member being provided with a threaded plug having a throttling bore therethrough communicating through a passageway with the interior of the steering gear housing. In this arrangement the plug also supports the lower end of a compression spring arranged in the cylindrical actuating member between the plug and the lower end of the steering shaft.

According to the invention the features providing the yieldable steering shaft leaves the configuration of the steering gear housing unchanged from that of the standard housing so that no additional space is required for the yieldable mechanism. Furthermore, very little in the way of additional structural elements are necessary in order to provide a yieldable steering shaft according to the present invention.

The invention includes other objects, advantages and features described hereinafter in connection with the accompanying drawings forming a part of this application and which illustrate one embodiment of the invention.

In the drawings:

Fig. 1 is a broken vertical sectional view through a steering mechanism and steering shaft embodying the features of the present invention, taken along the axial line of the steering shaft;

Fig. 2 is a sectional view of a portion of the steering shaft shown in Fig. 1 taken on the line II—II.

Referring to Fig. 1 of the drawings the elements shown include a steering shaft part 1 having a steering wheel 2 rigidly connected therewith. These elements are of standard design. When a conventional solid steering spindle is used with the elements 1 and 2 it terminates in a knurled end portion which extends into the slotted end of the steering shaft 1 and is firmly held therein by a set screw or clamping bolt. In the construction according to the invention a solid splined shaft 4 is employed having a knurled end 3 firmly clamped in the slotted end of the steering shaft 1 by means of a yoke clamp 5 and a clamping bolt 6. The splined shaft 4 is provided with keys or splines, for example the 4 regularly spaced splines 7, as shown in Fig. 2, which fit in corresponding spline grooves 8 in the upper portion 9a of a hollow cylindrical actuating member 9. The splined shaft 4 is slidable axially so that it comprises a piston shaft extending into the hollow actuating member 9.

The portion 9a of the hollow member 9 containing the spline grooves 8 is of smaller diameter than the remainder of the interior of the hollow member and fits the arcuate portions of the shaft 4. The remainder of the interior of the member is a cylinder housing a piston structure carried on a stud 13 on the lower end of the splined shaft 4. The piston structure includes a ring 10 fitting over the stud 13 and bearing against the shoulder formed by the portion 9a, a packing sleeve 11 arranged against the ring 10 and a bushing 12 held on the stud 13 by means of a pin 13a. The bushing 12 retains the packing and ring on the stud 13 and forms a piston in the cylindrical bore of the steering shaft 9. The ring 10 acts as a stop to hold the shaft 4 in the assembly. The extent of the inward movement of the splined shaft 4, and of the piston stroke is determined by the distance a between the upper end of the hollow member 9 and the lower end of the steering shaft 1.

The hollow actuating member of the steering mechanism located in the housing 14 is journaled in the steering gear housing and its lower end is closed by a threaded plug 15 provided with a throttling bore 16 for the admission of lubricating oil from the housing. The bore 16 communicates with the housing by way of a passageway 19 so that lubricating oil from the housing may flow through this passageway to the lower end of the plug and then through the throttling bore 16 to the interior of the actuating member 9, the housing 14 being closed opposite the plug 15 by a closure member 15a spaced from the plug 15. If desired the throttling bore may be located in the side of the member 9, near the plug, and the plug 15 be solid.

The actuating member 9 is mounted in bearings in the housing 14 in a conventional manner and is in the form of a hollow shaft having a cylindrical interior and provided on its exterior with an integral worm gear 9b which meshes with a steering nut 17 which transmits the rotation of the actuating member 9 in a conventional manner to a steering lever 18 during the operation of the steering mechanism. In addition to the bearings supporting the member 9 in the housing 14, conventional sealing means is also provided at its upper end for preventing the loss of lubricant from the housing. A compression spring 20 is arranged between the threaded plug 16 and the piston and end of shaft 4 in the member 9 for resiliently forcing the shaft 4 outwardly with respect to the mechanism in the housing 14 and member 9. Normally, the spring 20 maintains the ring 10 against the shoulder in the member 9, as indicated in Fig. 1.

The steering gear housing 14 is filled with lubricating oil which in part is used as a hydraulic fluid in the interior of the member 9 for counteracting and cushioning any inward motion of the piston and shaft 4.

When the driver of an automotive vehicle provided with the improved steering mechanism of the present invention is thrown forwardly onto the steering wheel 2, as for example during a collision, the force of the driver engaging the steering wheel is cushioned hydraulically and by the spring 20 as the wheel yields to the extent of the distance "a" shown in Fig. 1. During this incident, the oil present inside the hollow member 9 is forced gradually through the throttling bore 16 and the passageway 19 into the steering gear housing 14, and simultaneously the power of the spring 20 is overcome as the piston and steering shaft move downwardly in the hollow actuating member 9. The yieldable steering shaft mechanism in this way substantially reduces the impact of the driver on the steering wheel and avoids serious injury to the driver.

After the shaft 4 has been forced into the steering gear mechanism in the manner described above, the spring 20 acts to return the piston, shaft and steering wheel outwardly to its normal position as shown in Fig. 1 of the drawings, and at the same time lubricating oil is drawn in through the passageway 19 and throttling bore 16.

In the steering mechanism, including the yieldable steering shaft, of the present invention, the shaft is always keyed to the actuating member in the housing and is made yieldable without any visible exterior structure since the parts 4 and 5 may be in back of the dashboard or front wall of the vehicle.

What I claim is:

1. In a steering mechanism for automotive vehicles including a steering gear mounted in a housing holding a body of lubricating oil, the improvement in which the steering gear comprises a hollow actuating shaft-like member journaled in the housing and extending into the body of lubricating oil, said member including a passageway at its inner end for the flow of lubricating oil thereinto from the housing and for the discharge of lubricating oil therefrom into the housing, a yieldable steering shaft one end of which extends into said hollow member, said shaft being keyed to said hollow actuating member and mounted for axial movement into the actuating member, and means for biasing the steering shaft outwardly with respect to the hollow actuating member in the housing.

2. A steering mechanism as claimed in claim 1 in which said hollow actuating member has a cylindrical interior and the end of said shaft extending thereinto is provided with a piston fitting said cylindrical interior.

3. In a steering mechanism for automotive vehicles including a steering gear mounted in a housing holding a body of lubricating oil, the improvement in which the steering gear comprises a hollow actuating shaft-like member journaled in the housing in the body of lubricating oil and having an external thread, a steering shaft one end of which extends into one end of said hollow member, said shaft being keyed to said actuating member and mounted for axial movement into the hollow actuating member, spring means in said member for biasing the steering shaft outwardly with respect thereto, and a plug in the other end of said member having a throttling bore communicating with the interior of the housing, whereby oil may flow from the housing through the bore into said member for engagement by the end of the steering shaft in the hollow actuating member when the shaft is moved thereinto.

4. A steering mechanism as claimed in claim 3, in which the housing is provided with a passageway communicating with said bore.

5. In a steering mechanism for automotive vehicles including a steering gear mounted in a housing holding a body of lubricating oil, the improvement in which the steering gear comprises a cylindrical shaft-like actuating member journaled in the housing in the body of lubricating oil, a steering shaft one end of which extends into one end of said cylindrical actuating member, said shaft being keyed to said end of said actuating member and mounted for axial movement into the actuating member, a piston on the end of the shaft in said member, and means for biasing the steering shaft outwardly with respect to the actuating member, said member being provided with a throttling opening remote from said end, said opening leading into the steering gear housing for the flow of lubricating oil.

6. In a steering mechanism for automotive vehicles including a yieldable steering shaft and hydraulic dampening means therefor, a steering gear housing holding a body of lubricating oil, and a hollow steering spindle for steering the vehicle journaled in the housing and normally containing lubricating oil from said body in the housing, said steering shaft being keyed to said hollow spindle and connected for axial displacement with respect thereto, the lubricating oil in the hollow spindle being displaceable into the housing and adapted to dampen the movement of the steering shaft when it is moved axially into the hollow steering spindle.

7. A steering mechanism as claimed in claim 6, in which the end of the hollow steering spindle opposite the steering shaft is provided with a threaded plug having a throttling passageway therein for the flow of lubricating oil to and from the housing.

8. A steering mechanism as claimed in claim 7, including a biasing compression spring located in the hollow steering spindle between said plug and the end of the steering shaft in the hollow steering spindle.

References Cited in the file of this patent
UNITED STATES PATENTS

| Number | Name | Date |
| --- | --- | --- |
| 890,473 | Vraalstad | June 9, 1908 |
| 1,512,903 | Brenne | Oct. 28, 1924 |
| 1,702,675 | Ventura | Feb. 19, 1929 |
| 1,806,136 | Weiss | May 19, 1931 |
| 2,028,953 | Roark | Jan. 28, 1936 |
| 2,140,319 | Heppner et al. | Dec. 13, 1938 |
| 2,451,061 | Booth | Oct. 12, 1948 |
| 2,464,856 | Finley | Mar. 22, 1949 |